US008230059B1

(12) United States Patent
Santos et al.

(10) Patent No.: US 8,230,059 B1
(45) Date of Patent: Jul. 24, 2012

(54) METHOD OF MONITORING RESOURCE USAGE IN COMPUTING ENVIRONMENT

(75) Inventors: Jose Renato Santos, San Jose, CA (US); Aravind Menon, Lausanne (CH); Yoshio Frank Turner, Redwood City, CA (US); Gopalakrishnan Janakiraman, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1685 days.

(21) Appl. No.: 11/270,137

(22) Filed: Nov. 8, 2005

(51) Int. Cl.
*G06F 15/173* (2006.01)
*G06F 9/455* (2006.01)

(52) U.S. Cl. .......................................... 709/224; 718/1

(58) Field of Classification Search ................. 709/224; 718/1
See application file for complete search history.

(56) References Cited

U.S. PATENT DOCUMENTS

| | | | |
|---|---|---|---|
| 6,662,358 B1 | 12/2003 | Berry et al. | |
| 6,735,758 B1 | 5/2004 | Berry et al. | |
| 6,970,924 B1 * | 11/2005 | Chu et al. | 709/224 |
| 7,610,266 B2 * | 10/2009 | Cascaval et al. | 1/1 |
| 7,788,664 B1 | 8/2010 | Gopalakrishnan | |
| 2002/0129085 A1 * | 9/2002 | Kubala et al. | 709/104 |
| 2005/0262181 A1 * | 11/2005 | Schmidt et al. | 709/200 |
| 2006/0095559 A1 * | 5/2006 | Mangan et al. | 709/224 |
| 2006/0236067 A1 * | 10/2006 | Attinella et al. | 711/173 |
| 2007/0083643 A1 * | 4/2007 | Arndt et al. | 709/224 |

OTHER PUBLICATIONS

'Xenoprof—Performance profiling in Xen User Guide', Hewlett-Packard Co., Oct. 19, 2005.*

Jennifer M. Anderson et al., Continuous Profiling: Where Have All the Cycles Gone?, SRC Technical Note 1997—016a, 1997, Systems Research Center, Palo Alto, CA.
Paul Barham et al., Xen and the Art of Virtualization, Proceedings of the nineteenth ACM symposium on Operating systems principles, 2003, pp. 164-177, ACM Press, New York, NY.
Bryan Clark et al., Xen and the Art of Repeated Research, Proceedings of the FREENIX Track: 2004 USENIX Annual Technical Conference, Jun. 27, 2004, pp. 135-144, The USENIX Association, Berkeley CA.
Aaron J. Goldberg et al., Mtool: An Integrated System for Performance Debugging Shared Memory Multiprocessor Applications, IEEE Transactions on Parallel and Distributed Systems, 1993, 4(I):28-40, IEEE, New York, NY.
Xenoprof—System-wide profiler for Xen VM, Apr. 2005, Hewlett-Packard Development Company, L.P., Palo Alto, CA. <http://xenoprof.sourceforge.net/>.
Aravind Menon et al., Xenoprof—Performance profiling in Xen: User Guide, Version 1.0, Apr. 8, 2005, Hewlett-Packard Co. Palo Alto, CA.
Aravind Menon et al., Diagnosing Performance Overheads in the Xen Virtual Machine Environment, HP Labs Technical Report HPL-2005-80 May 6, 2005, Hewlett-Packard Development Company, L.P., Palo Alto, CA.
Aravind Menon et al., Xenoprof—Performance profiling in Xen: User Guide, Version 1.1, May 25, 2005, Hewlett-Packard Co. Palo Alto, CA.

(Continued)

*Primary Examiner* — Jerry Dennison

(57) ABSTRACT

An embodiment of monitoring resource usage in a computing environment begins with a first client registering a session with a monitoring entity. The session comprises an event type, a count, a start condition, an end condition, and a sample type. Next, a second client registers with the session. Upon occurrence of the start condition and until occurrence of the end condition or until interrupted, the monitoring entity iteratively initiates a counting of occurrences of the event type that continues until reaching the count and saves a sample according to the sample type upon reaching the count. The resource monitoring entity provides at least a portion of a plurality of samples to the first client.

38 Claims, 3 Drawing Sheets

OTHER PUBLICATIONS

Shirley V. Moore, A Comparison of Counting and Sampling Modes of Using Performance Monitoring Hardware, 2002, Knoxville, TN.

Brinkley Sprunt, The Basics of Performance Monitoring Hardware, IEEE Micro, 2002, 22(4):64-71, IEEE Computer Society, New York, NY, Los Alamitos, CA.

Brinkley Sprunt, Pentium 4 Performance Monitoring Features, IEEE Micro, 2002, 22(4):72-82, IEEE Computer Society, New York, NY, Los Alamitos, CA.

Andrew Whitaker et al., Constructing Services with Interposable Virtual Hardware, Mar. 29, 2005, Seattle, WA.

Gopalakrishnan Janakiraman et al. United States Patent Application No., filed: Nov. 8, 2005.

Yoshio Frank Turner et al. et al. United States Patent Application No., filed: Nov. 8, 2005.

* cited by examiner

METHOD OF MONITORING RESOURCE USAGE IN COMPUTING ENVIRONMENT

RELATED APPLICATIONS

This application is related to U.S. Application Nos. U.S. application Ser. No. 11/270,113, now U.S. Pat. No. 7,788,664 and U.S. application Ser. No. 11/270,089, filed on Nov. 8, 2005, the contents of which are hereby incorporated by reference.

FIELD OF THE INVENTION

The present invention relates to the field of computing. More particularly, the present invention relates to the field of computing where there is a desire to monitor resource usage in a computing environment.

BACKGROUND OF THE INVENTION

Hardware performance counters are processor registers that count performance events such as cache misses, virtual memory translation look-aside buffer misses, and number of executed instructions. Some software profiling tools employ hardware performance counters to sample hardware events associated with code execution in order to characterize software performance. OProfile for Linux is an example of such a software profiling tool. Such software profiling tools operate above or within an operating system that in turn operates directly on computer hardware. To profile a specific event, a hardware performance counter is programmed to generate an interrupt to the operating system upon the hardware performance counter reaching a specified count for the specific event. Upon receiving the interrupt, the interrupt handler of the operating system reads the program counter at the time of the interrupt to determine the software that was executing when the hardware performance counter reached the specified count. Typically, the hardware performance counter is reprogrammed each time it expires, which generates a sequence of samples for the specific event. The sequence of samples provides a statistical distribution for the specific event, which may be used to characterize software that was executing while the samples were taken. This provides insight into the portion of the software that is generating the most instances of the specific event. For example, a particular sequence of samples may track instructions that are executing most often. Multiple hardware events may be simultaneously profiled to improve the characterization of the software. Usually, software profiling tools such as OProfile use a non-maskable interrupt upon reaching the specified count since non-maskable interrupts allow profiling of system software that runs with interrupts disabled. However, a maskable interrupt is sometimes used when profiling software that executes with interrupts enabled.

A virtual machine monitor is a software layer that interposes between one or more operating system instances and computer hardware. Sometimes the virtual machine monitor is referred to as a hypervisor, which is a reference to the virtual machine monitor's privilege level. It is a "hypervisor" because its privilege level exceeds a "supervisor" privilege level of an operating system's kernel mode. Each operating system instance is referred to as a virtual machine, which is capable of running its own applications. The virtual machine monitor allocates processor time and memory space to each virtual machine. For example, consider first and second virtual machines that are operating above a virtual machine monitor. In a first time period, the processor is allocated to the first virtual machine; in a second time period, the processor is allocated to the second virtual machine; in a third time period, the processor is allocated to the first virtual machine again; and so forth. Because a virtual machine that hosts an operating system might not be operating when an interrupt is issued, the operating system hosted by the virtual machine is unable to reliably receive interrupts. This makes profiling tools inoperable in virtual machines.

More generally, there are numerous instances in computing where event related information for a computing resource shared by a number of lower privileged computing entities is available to a computing entity with a higher privilege level but not the lower privileged computing entities. Examples include: a distributed computing environment having multiple computing nodes (lower privileged entities) that share a switch or switching fabric in which the switch or a monitoring node is the higher privileged entity; a shared storage device having multiple storage device clients (lower privileged entities) that access data through storage device software (a higher privileged entity); and a file server or a database server having multiple clients (lower privileged entities) that access data through file server software or a database management system (a higher privileged entity).

SUMMARY OF THE INVENTION

The present invention is a method of monitoring resource usage in a computing environment. According to an embodiment, the method comprises first and second steps, iterative performance of third and fourth steps, and a fifth step. In the first step, a first client computing entity registers a resource monitoring session with a resource monitoring entity. The resource monitoring session comprises an event type, a count, a start condition, an end condition, and a sample type. In the second step, a second client computing entity registers with the resource monitoring session. Upon occurrence of the start condition and until occurrence of the end condition or until interrupted, the resource monitoring entity iteratively performs the third and fourth steps. In the third step, the resource monitoring entity initiates a counting of occurrences of the event type by a counter that continues until the counter reaches the count. In the fourth step, the resource monitoring entity saves a sample according to the sample type upon the counter reaching the count. In the fifth step, the resource monitoring entity provides at least a first portion of a plurality of samples to the first client computing entity.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention is a method of monitoring resource usage in a computing environment. Embodiments of the method have a range of applications including performance optimization, diagnosing and fixing bugs/errors, flagging misbehaving entities, and billing based upon resource usage.

Figure 1:
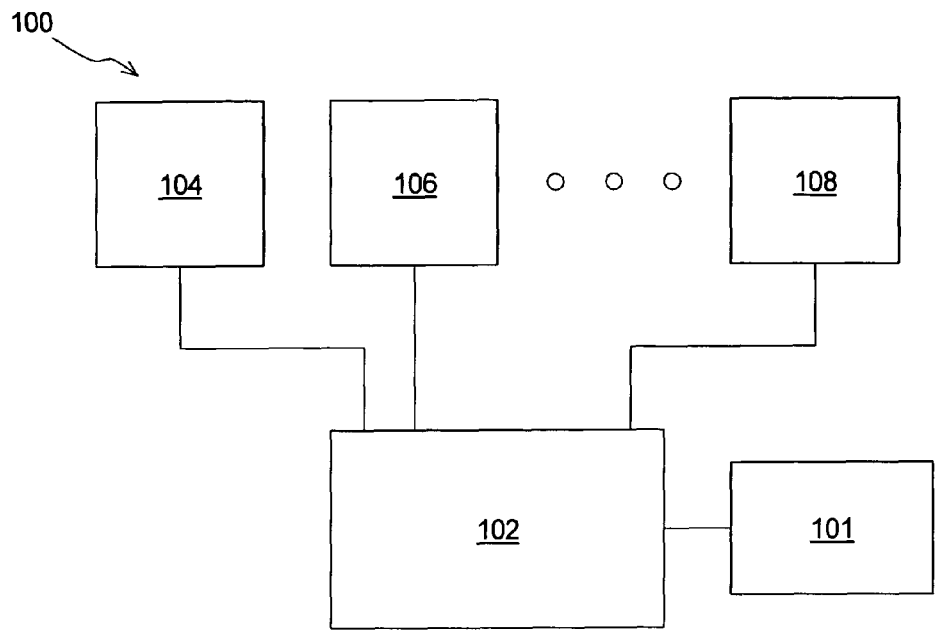
FIG. 1 schematically illustrates a computing environment that employs a method of monitoring resource usage in accordance with an embodiment of the present invention.

An embodiment of a computing environment that employs a method of monitoring resource usage of the present invention is illustrated schematically in FIG. 1. The computing environment 100 comprises a shared resource 101, a resource monitoring entity 102, and first through mth client computing entities, 104 . . . 108. In an embodiment, the shared resource 101 is a computer hardware platform, the resource monitoring entity 102 is a virtual machine monitor, and the first through mth client computing entities, 104 . . . 108, are virtual machines. In another embodiment, the shared resource 101 is a computer hardware platform, the resource monitoring entity 102 is a software profiling module, and the first through mth computing entities, 104 . . . 108, are processes. In another embodiment, the shared resource 101 is a switch or a monitoring node for a switching fabric, the resource monitoring entity 102 is software for the switch or the monitoring node, and the first through mth client computing entities, 104 . . . 108, are computing nodes that use the switch or the switching fabric for network communication or data transfer. In another embodiment, the shared resource 101 is a Web server, the resource monitoring entity 102 is software on the Web server, and the first through mth client computing entities, 104 . . . 108, are Web clients. In other embodiments, the shared resource 101 is a shared storage device, a NIC (network interface card), a file server, or a database server, the resource monitoring entity 102 is storage device software, NIC software, file server software, or a database management system, and the first through mth client computing entities, 104 . . . 108, are storage device clients, network interface card clients, file server clients, or database server clients, respectively.

Figure 2:
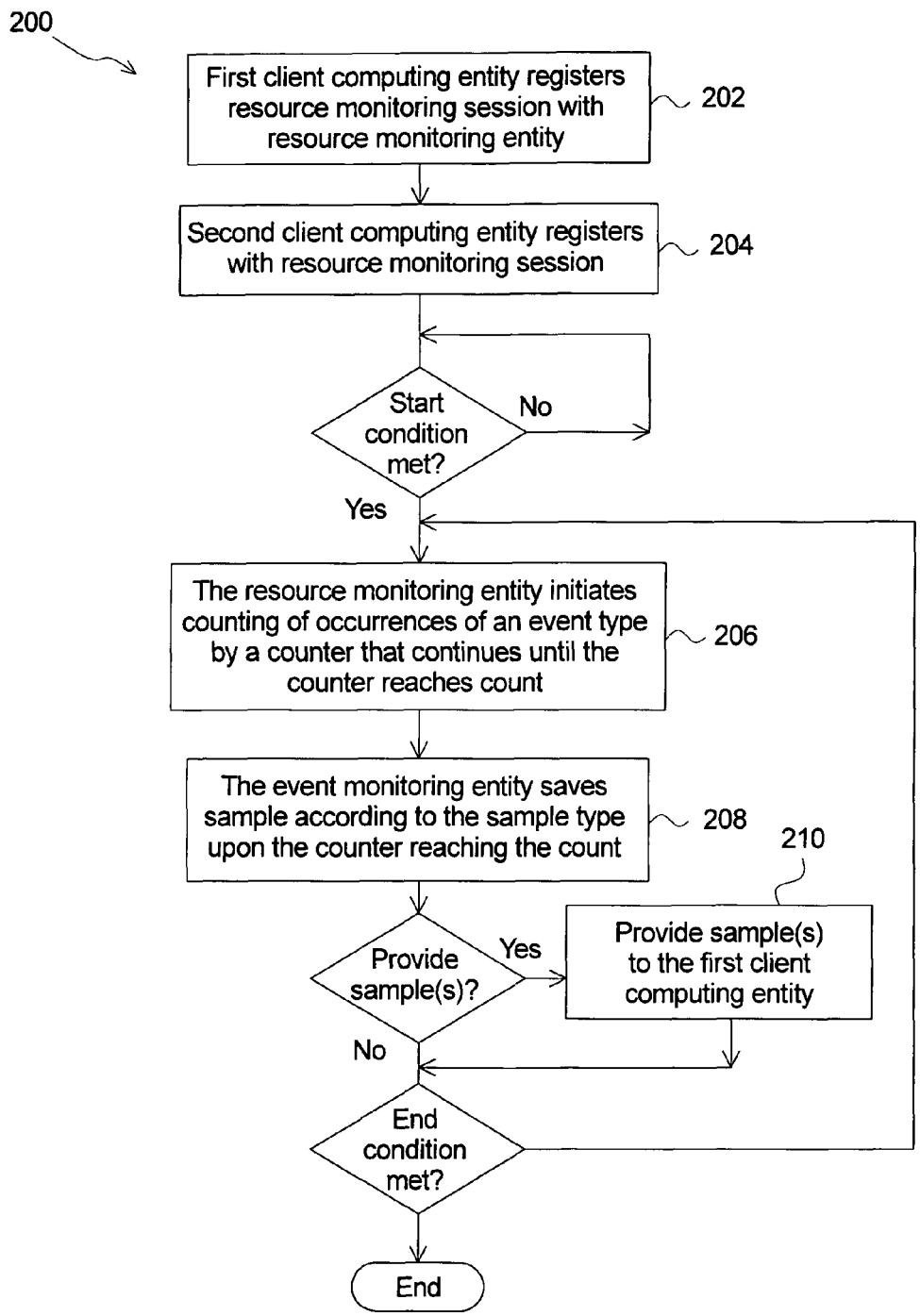
FIG. 2 illustrates an embodiment of a method of monitoring resource usage in a computing environment of the present invention as a flow chart.

An embodiment of a method of monitoring resource usage in a computing environment of the present invention is illustrated as a flow chart in FIG. 2. The method can be performed by computer code, stored in non-transitory computer readable medium, upon execution by a computer. The method 200 comprises first and second steps, 202 and 204, iterative performance of third and fourth steps, 206 and 208, and a fifth step 210. In the first step 202, a first client computing entity (e.g., the first client computing entity 104 of FIG. 1) registers a resource monitoring session with a resource monitoring entity (e.g., the resource monitoring entity 102). For example, the first client computing entity may register the resource monitoring session by issuing a session registration command to the resource monitoring entity. In an embodiment, the first client computing entity has a unique identifier that distinguishes the client computing entity from other client computing entities that may contact the resource monitoring entity. Preferably, the client computing entity is a virtual machine and the resource monitoring entity is a virtual machine monitor. Alternatively, the client computing entity is another type of client computing entity and the resource monitoring entity is another type of resource monitoring entity such as indicated relative to FIG. 1 above.

The resource monitoring session comprises an event type, a count, a start condition, an end condition, and a sample type. If the resource monitoring entity is a virtual machine monitor, the event type may be a hardware event such as a clock cycle or a cache miss that is counted by a hardware event counter (e.g., a hardware performance counter). If the resource monitoring entity is a switch or a monitoring node for a switching fabric, the event type may be a network transfer event such as a dropped packet or a clock cycle that is counted by a hardware counter or a software counter. If the resource monitoring entity is a Web server, the event type may be a Web server event such as an executed instruction or a clock cycle that is counted by a hardware counter or a software counter. If the resource monitoring entity is storage device software, the event type may be a storage device usage, performance, or error event such as a disk cache miss, a clock cycle, an error, a corrected 1-bit error, and a corrected 2-bit error that is counted by a hardware counter or a software counter. If the resource monitoring entity is MC software, the event type may be a network card usage, performance, or error event such as a dropped packet, a clock cycle, or an instruction that is counted by a hardware counter or a software counter. If the resource monitoring entity is file server software, the event type may be a file server performance, usage, error, or access violation event such as a file cache miss, a clock cycle, an instruction, a lock-enqueue-events, or a decryption key failure that is counted by a hardware counter or a software counter. If the resource monitoring entity is a database management system, the event type may be a database system usage or performance event such as database cache miss, a clock cycle, an instruction, or lock-enqueue-event that is counted by a hardware counter or a software counter.

The start condition may be registration of the resource monitoring session, another client computing entity joining the resource monitoring session, reaching a particular point-in-time, an appearance of a particular address (e.g., a memory address, a storage address, or a network address), an appearance of a particular protocol (e.g., for a network connection), access to a particular file system, database, or table within a database, or some other start condition. The start condition may be a default start condition such as the registration of the resource monitoring session, which may be replaced with another start condition by the client computing entity.

The end condition may be notification by the client computing entity, another client computing entity leaving the resource monitoring session, reaching a particular point-in-time, disappearance of a particular address (e.g., a memory address, a storage address, or a network address), disappearance of a particular protocol (e.g., for a network connection), closing of a particular file system, database, or table within a database, or some other end condition. The end condition may be a default end condition such as the notification by the client computing entity, which may be replaced by another end condition by the client computing entity.

The sample type may be any of a range of sample types, some example of which follow. If the shared resource is a computer hardware platform, the sample type may be a code-in-execution indicator such as an operating mode identifier or a code-in-execution identifier (e.g., a line of code or a block of code). If the shared resource is a switch or a monitoring node for a switching fabric, the sample type may be a packet-based identifier such as a protocol identifier, a packet size, a connection identifier, a source identifier, a destination identifier, or a client identifier. If the shared resource is a Web server, the sample type may be a request-based identifier such as a client identifier, or an application identifier. If the shared resource is a storage device, the sample type may be an application identifier, a connection identifier, or a meta-data identifier. If the shared resource is a NIC, the sample type may be a packet size, or a connection identifier. If the shared resource is a file server, the sample type may be a client identifier, a file system identifier, or a lock queue length. If the shared resource is a database, the sample type is may be a client identifier, an application identifier, a lock queue length, or a database query. The sample type may be a default sample type, which may be replaced with another sample type by the client computing entity.

In the second step 204, a second client computing entity (e.g., the second client computing entity 106 of FIG. 1) registers with the resource monitoring session, which is hosted by the resource monitoring entity. The second virtual machine may register with the resource monitoring session by issuing a session registration command.

Upon occurrence of the start condition and until occurrence of the end condition or until interrupted, the resource monitoring entity iteratively performs the third and fourth steps, 206 and 208. In the third step 206, the resource monitoring entity initiates a counting of occurrences of the event type by a counter that continues until the counter reaches the count. In the fourth step 208, the resource monitoring entity saves a sample according to the sample type upon the counter reaching the count.

In the fifth step 210, the resource monitoring entity provides at least a first portion of a plurality of samples to the first client computing entity. The fifth step 210 may also include providing at least a second portion of the plurality of samples to the second client computing entity. The fifth step 210 may provide samples to the first or second client computing entity that were taken when the first or second client computing entity, respectively, was accessing the shared resource when the count was reached. Or, the fifth step 210 may provide samples to the first and second client computing entities that were taken when a client computing entity that is registered with the resource monitoring session was accessing the shared resource when the count was reached. Or, the fifth step 210 may provide samples to the first and second client computing entity that were taken when any client computing entity was accessing the shared resource when the count was reached. The fifth step 210 may be performed on an individual sample basis or on a group of samples basis. For example, the individual sample basis may provide a particular sample to the first virtual machine or to the second virtual machine or both. Or, for example, the group of samples basis may provide a group of samples to the first virtual machine and a group of samples to the second virtual machine after a series of iterations of the third and fourth steps, 206 and 208.

In an alternate embodiment, the resource monitoring session further comprises additional event types, additional counts, and additional sample types. In this alternative embodiment, the resource monitoring entity iteratively performs the third and fourth steps, 206 and 208, for each of the event types. In such an alternative embodiment, the resource monitoring entity may maintain first and second event tables for the first and second client computing entities, respectively. For example, each event table may include multiple entries of an event identifier and a list of associated event types. Each event table may include a count and a sample type for each event type. When the first client computing entity registers the resource monitoring session with the resource monitoring entity, the first client computing entity may identify the event type or event types using one or more of the event identifiers in its event table. When the second client computing entity registers with the resource monitoring session, the second client computing may use the one or more event identifiers that are also included in its event table.

In an alternative embodiment, additional client computing entities join the resource monitoring session by registering with the resource monitoring session. For example, the additional client computing entities may register with the resource monitoring session by each issuing a session registration command to the resource monitoring entity. Here, the resource monitoring entity may maintain an event table for each client computing entity, where entries in a particular event table include an event identifier and a list of associated event types. The particular event table may include a count and a sample type for each event type.

In an alternative embodiment, client computing entities may control access to sessions through an access control command. The access control command provides a mechanism for allowing or disallowing access to sessions and samples produced by sessions. Upon receipt of an access control command, the resource monitoring entity determines whether the client computing entity that issued the command has the authority to do so. Upon verification of authority, the resource monitoring entity may modify an access control table to indicate the change in access control. For example, the access control table may include multiple entries of an accessing client computing entity identifier, the event identifier, and an indication of whether access is granted or denied.

In an alternative embodiment, a plurality of additional client computing entities may each register their own resource monitoring session with the resource monitoring entity by issuing a session registration command. Alternatively, the session registration command may be used by one or more client computing entities to register with one or more existing sessions. Such a session registration command provides a mechanism for coordinating monitoring of multiple client computing entities and multiple resource monitoring sessions. In this embodiment, the resource monitoring entity may maintain a session table. For example, the session table may include multiple session entries, where each entry provides session related information for a session. A particular session entry may include a session identifier, client computing identifiers registered with the particular session, and dynamic state relative to a start condition or an end condition or both for the particular session.

Figure 3:
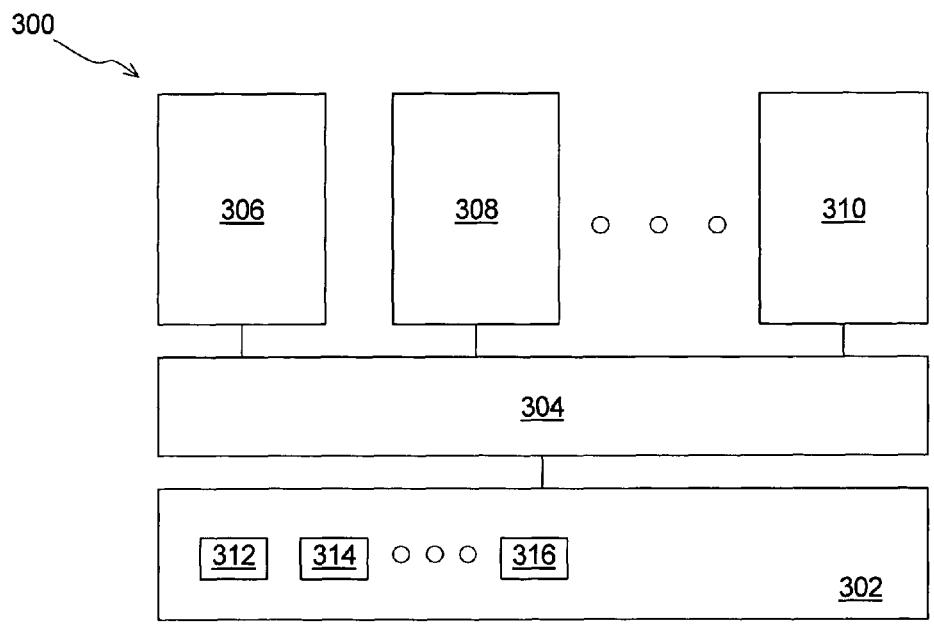
FIG. 3 schematically illustrates a computing system that employs a method of monitoring resource usage in accordance with an embodiment of the present invention.

An embodiment of a computing system that employs a method of monitoring resource usage of the present invention is illustrated schematically in FIG. 3. The computing system 300 comprises computer hardware 302, a virtual machine monitor 304, and first through mth virtual machines, 306 . . . 310. The computer hardware 302 includes a processor (not shown), memory (not shown), and first through nth hardware event counters, 312 . . . 316. The first through mth virtual machines, 306 . . . 310, each include an operating system and an ability to execute one or more applications. The virtual machine monitor 304 allocates processor time and memory space to the first through mth virtual machines, 306 . . . 310, such that each of the first through mth virtual machines, 306 . . . 310, is given an abstracted view that it is an individual computer system executing its own operating system and applications. The first through nth hardware event counters, 312 . . . 316, may count any of a number of event types such as performance events, debug events, error events, or security/violation events. One or more of the first through nth hardware event counters, 312 . . . 316, may be hardware performance counters that count performance events such as executed instructions, clock cycles, cache events, cache hits, cache misses, virtual memory translation look-aside buffer events, virtual memory translation look-aside buffer hits, virtual memory translation look-aside buffer misses, or branch events.

Figure 4:
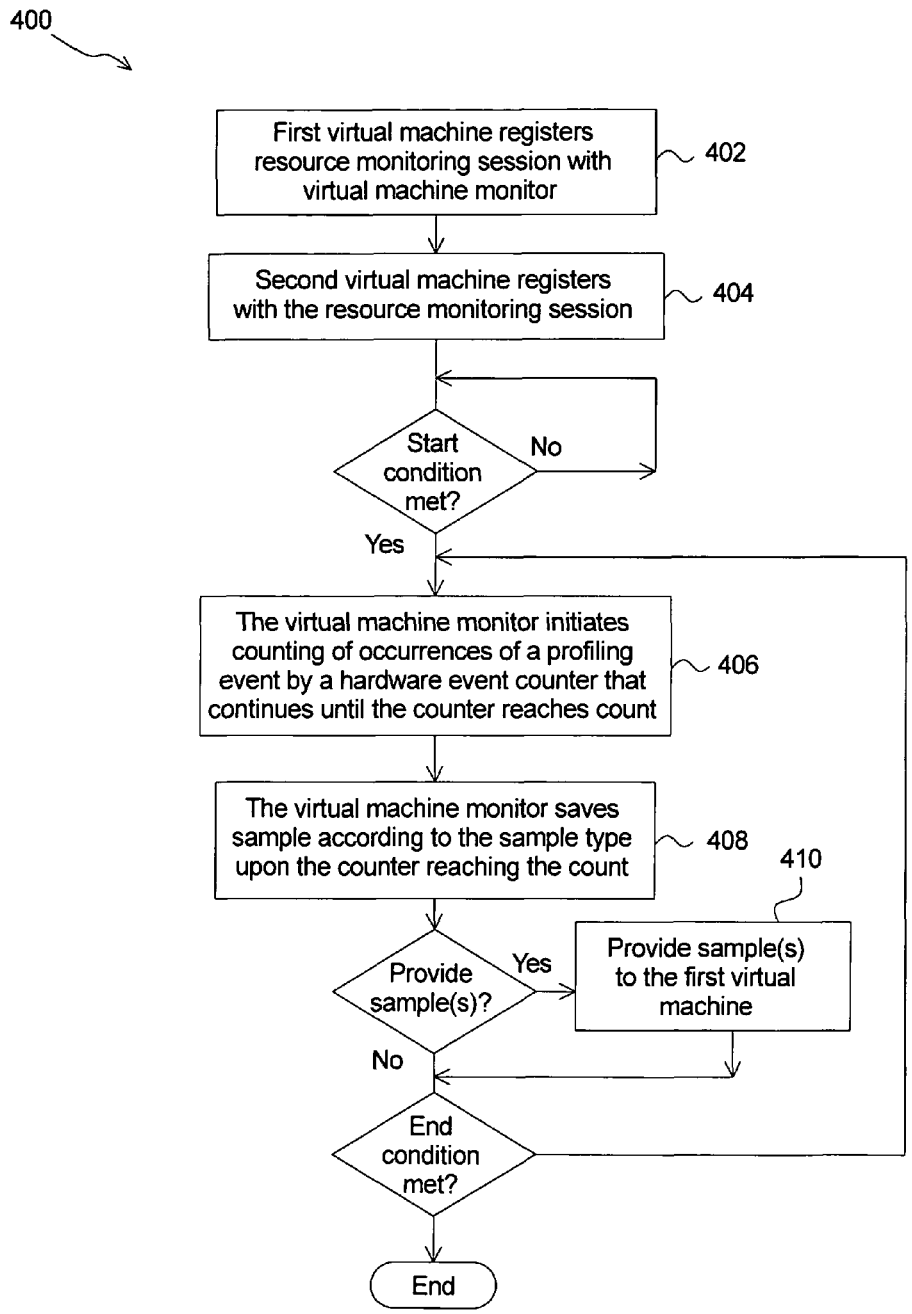
FIG. 4 illustrates an embodiment of a method of monitoring resource usage in a computing environment of the present invention as a flow chart.

An embodiment of a method of monitoring resource usage in a computing environment of the present invention is illustrated as a flow chart in FIG. 4. The method can be performed by computer code, stored in non-transitory computer readable medium, upon execution by a computer. The method 400 comprises first and second steps, 402 and 404, iterative performance of third and fourth steps, 406 and 408, and a fifth step 410. In the first step 402, a first virtual machine (e.g., the first virtual machine 306 of FIG. 3) registers a resource monitoring session with a virtual machine monitor (e.g., the virtual machine monitor 304). For example, the first virtual machine may register the resource monitoring session by issuing a session registration command to the virtual machine monitor. In an embodiment, the first virtual machine has a unique identifier that distinguishes the first virtual machine from other virtual machines that may be operating above the virtual machine monitor.

The resource monitoring session comprises a profiling event for a hardware event counter (e.g., the first hardware event counter 312), a count, a start condition, an end condition, and a sample type. The profiling event may be selected from performance events such as executed instructions, clock cycles, cache events, cache hits, cache misses, virtual memory translation look-aside buffer hits, virtual memory translation look-aside buffer misses, and branch events. Or, the profiling events may be selected from debug events, error events, or security/violation events. More generally, the profiling event is any profiling event that may be selected for a processor that is executing code associated with the virtual machine monitor or a virtual machine operating above the virtual machine monitor. Manufacturers of processors include capabilities for monitoring various profiling events within processors and routinely include additional or other profiling events in new processors.

The start condition may be registration of the resource monitoring session, another client computing entity joining the resource monitoring session, reaching a particular point-in-time, an appearance of a particular memory address, or another start condition. The end condition may be notification by the virtual machine, a virtual machine leaving the resource monitoring session, reaching a particular point-in-time, disappearance of a particular address, or another end condition. The sample type may be a code-in-execution indicator such as an operating mode (e.g., a user mode, a kernel mode, or a hypervisor mode) or a code-in-execution identifier. The code-in-execution identifier identifies particular code executing at a time of reaching the count for the profiling event. For example, the code-in-execution identifier may identify a line of code executing at the time of reaching the count or a block of code executing at the time of reaching the count. The start condition, the end condition, or the sample type may be a default start condition, default end condition, or default sample type, respectively.

In the second step 404, a second virtual machine (e.g., the second virtual machine 308 of FIG. 3) registers with the resource monitoring session. The second virtual machine may register with the resource monitoring session by issuing a session registration command. Additional virtual machines may join the resource monitoring session by registering with the resource monitoring session. For example, the additional virtual machines may join the resource monitoring session by each issuing a session registration command. Here, the resource monitoring entity may maintain an event table for each of the first and second virtual machines and any other virtual machines registered with the resource monitoring session, where entries in a particular event table each include an event identifier and a list of associated events. When the first virtual machine registers the resource monitoring session with the resource monitoring entity, the first virtual machine may identify one or more events by an event identifier. When the second virtual machine registers with the resource monitoring session, the second virtual machine may identify the one or more events by the event identifier.

Virtual machines may control access to sessions through an access control command. The access control command provides a mechanism for allowing or disallowing access to sessions and samples produced by sessions. Upon receipt of an access control command, the virtual machine monitor determines whether the virtual machine that issued the command has the authority to do so. Upon verification of authority, the virtual machine monitor may modify an access control table to indicate the change in access control. For example, the access control table may include multiple entries of an accessing virtual machine identifier, the resource usage criterion identifier, and an indication of whether access is granted or denied.

Upon occurrence of the start condition and until occurrence of the end condition or until interrupted, the virtual machine monitor iteratively performs the third and fourth steps, 406 and 408. In the third step 406, the virtual machine monitor initiates a counting of occurrences of the profiling event by a counter that continues until the counter reaches the count. In the fourth step 408, the virtual machine monitor saves a sample according to the sample type upon the counter reaching the count.

In the fifth step 410, the virtual machine monitor provides at least a first portion of a plurality of samples to the first virtual machine. The fifth step 410 may also include providing at least a second portion of the plurality of samples to the second virtual machine. The fifth step 410 may provide samples to the first or second virtual machine that were taken when the first or second virtual machine, respectively, was accessing the computer hardware when the count was reached. Or, the fifth step 410 may provide samples to the first and second virtual machines that were taken when a virtual machine that is registered with the resource monitoring session was accessing the computer hardware when the count was reached. Or, the fifth step 410 may provide samples to the first and second virtual machines that were taken when any virtual machine was accessing the computer hardware when the count was reached. The fifth step 410 may be performed on an individual sample basis or on a group of samples basis. For example, the individual sample basis may provide a particular sample to the first virtual machine or to the second virtual machine or both. Or, for example, the group of samples basis may provide a first portion of the group of samples to the first virtual machine and a second portion of the group of samples to the second virtual machine, or the group of samples basis my provide an entire group of samples to both the first and second virtual machines.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of monitoring resource usage in a computing environment comprising the steps of:
 a first client computing entity registering a resource monitoring session with a resource monitoring entity in the computing environment that comprises hardware, the resource monitoring session comprising an event type, a count, a start condition, an end condition, and a sample type;
 a second client computing entity registering with the resource monitoring session;

upon occurrence of the start condition and until occurrence of the end condition or until interrupted, the resource monitoring entity iteratively:

initiating a counting of occurrences of the event type by a counter that continues until the counter reaches the count; and saving a sample according to the sample type upon the counter reaching the count; and the resource monitoring entity providing at least a portion of a plurality of samples to the first client computing entity, and at least a portion of the plurality of samples to the second client computing entity.

2. The method of claim 1 wherein the first and second client computing entities are selected from processes, virtual machines, nodes, Web clients, storage device clients, network interface card clients, file server clients, and database server clients.

3. The method of claim 1 wherein the event type is selected from a hardware event, a network transfer event, a Web server event, a storage device usage event, a storage device performance event, a storage device error event, a network card usage event, a network card performance event, a network card error event, a file server performance event, a file server usage event, a file server error event, a file server access violation, a database system usage event, and a database performance event.

4. The method of claim 1 wherein the resource monitoring entity is selected from an operating system, a virtual machine monitor, a switch software, a monitoring node software, Web server software, storage device software, network interface card software, file server software, and database management software.

5. The method of claim 1 wherein the sample type is selected from a code-in-execution indicator, a packet-based identifier, a protocol identifier, a packet size, a client identifier, an application identifier, a connection identifier, a metadata identifier, a file system identifier, a lock queue length, and a database query.

6. The method of claim 1 wherein the resource monitoring entity has a higher privilege level than a privilege level for the first and second client computing entities.

7. The method of claim 1 wherein each sample includes a resource measurement, wherein the resource measurement measures one of (1) a resource usage of a resource in the computing environment by the first and second client computing entities independent of other resource usage of the resource by other client computing entities, and (2) a collective resource usage of the resource by a group of client computing entities that includes the first and second client computing entities.

8. The method of claim 1 wherein the event type and the count are a first event type and a first count and the resource monitoring session further comprises a second event type and a second count.

9. The method of claim 8 wherein, upon occurrence of the start condition, the resource monitoring entity iteratively counts occurrences of the second event type until reaching the second count and saves a second sample, thereby saving a plurality of second samples.

10. The method of claim 9 wherein the resource monitoring session further comprises a third event type and a third count.

11. The method of claim 10 wherein, upon occurrence of the start condition, the resource monitoring entity iteratively counts occurrences of the third event type until reaching the third count and saves a third sample, thereby saving a plurality of third samples.

12. The method of claim 11 wherein the resource monitoring entity maintains first, second, and third event tables for the first, second, and third client computing entities, respectively.

13. The method of claim 12 wherein a particular entry in each of the first, second, and third event tables includes an event identifier and the event type.

14. The method of claim 1 wherein the start condition comprises the second client computing entity registering with the resource monitoring session.

15. The method of claim 1 further comprising a third client computing entity registering with the resource monitoring session.

16. The method of claim 15 wherein the start condition comprises the second and third client computing entities registering with the resource monitoring session.

17. The method of claim 15 wherein the resource monitoring entity maintains an access control table that indicates permissions for the first, second, and third client computing entities to the plurality of samples.

18. The method of claim 17 wherein a privileged client computing entity has a special permission that allows the privileged client computing entity to issue an access control command that modifies the access control table.

19. The method of claim 1 wherein the resource monitoring session is a first resource monitoring session and further comprising a third client computing entity registering a second resource monitoring session with the resource monitoring entity.

20. The method of claim 19 wherein the resource monitoring entity maintains a session table of status information for the first and second monitoring sessions.

21. The method of claim 1 wherein the start condition is selected from registration of the resource monitoring session, another client computing entity joining the resource monitoring session, reaching a particular point-in-time, an appearance of a particular address, an appearance of a particular protocol, and access to a particular file system, database, or table within a database.

22. The method of claim 1 wherein the end condition is selected from notification by the first client computing entity, another client computing entity leaving the resource monitoring session, reaching a particular point-in-time, disappearance of a particular address, disappearance of a particular protocol, and closing of a particular file system, database, or table within a database.

23. A method of monitoring resource usage in a computing environment comprising the steps of:

a first virtual machine registering a resource monitoring session with a virtual machine monitor, the resource monitoring session comprising a profiling event, a count, a start condition, an end condition, and a sample type;

a second virtual machine registering with the resource monitoring session;

upon occurrence of the start condition and until occurrence of the end condition or until interrupted, the virtual machine monitor iteratively:

initiating a counting of occurrences of the profiling event by a hardware event counter that continues until the hardware event counter reaches the count; and saving a sample according to the sample type upon the hardware event counter reaching the count; and the virtual machine monitor providing at least a portion of a plurality of samples to the first virtual machine, and at least a portion of the plurality of samples to the second virtual machine.

24. The method of claim 23 wherein the profiling event is selected from a performance event, a debug event, an error event, and a security/violation event.

25. The method of claim 23 wherein the profiling event is selected from an executed instruction, a clock cycle, a cache event, a cache hit, a cache miss, a virtual memory translation look-aside buffer event, a virtual memory translation look-aside buffer hit, and a virtual memory translation look-aside buffer miss.

26. The method of claim 23 wherein the sample type is a code-in-execution indicator.

27. The method of claim 26 wherein the code-in-execution indicator is selected from an operating mode and a code-in-execution identifier.

28. The method of claim 27 wherein the operating mode is selected from a user mode, a kernel mode, and a hypervisor mode.

29. The method of claim 27 wherein the code-in execution identifier is selected from an instruction identifier, a group-of-instructions identifier, a function identifier, and a software module identifier.

30. A non-transitory computer readable medium comprising computer code that when executed by a computer implements a method of monitoring resource usage in a computing environment by a resource monitoring entity, the method of monitoring the resource usage by the resource monitoring entity comprising the steps of:
    receiving a first registration from a first client computing entity that registers a resource monitoring session with the resource monitoring entity, the resource monitoring session comprising an event type, a count, a start condition, an end condition, and a sample type;
    receiving a second registration from a second client computing entity that registers the second client computing entity with the resource monitoring session;
    upon occurrence of the start condition and until occurrence of the end condition or until interrupted, iteratively:
    initiating a counting of occurrences of the event type by a counter that continues until the counter reaches the count; and
    saving a sample according to the sample type upon the counter reaching the count; and
    providing at least a portion of a plurality of samples to the first client computing entity, and at least a portion of the plurality of samples to the second client computing entity.

31. A non-transitory computer readable medium comprising computer code that when executed by a computer implements a method of monitoring resource usage in a computing environment by a virtual machine monitor, the method of monitoring the resource usage by the virtual machine monitor comprising the steps of:
    receiving a first registration from a first virtual machine that registers a resource monitoring session with the virtual machine monitor, the resource monitoring session comprising a profiling event, a count, a start condition, an end condition, and a sample type;
    receiving a second registration from a second virtual machine that registers the second virtual machine with the resource monitoring session;
    upon occurrence of the start condition and until occurrence of the end condition or until interrupted, iteratively:
    initiating a counting of occurrences of the profiling event by a hardware event counter that continues until the hardware event counter reaches the count; and
    saving a sample according to the sample type upon the hardware event counter reaching the count; and
    providing at least a portion of a plurality of samples to the first virtual machine, and at least a portion of the plurality of samples to the second virtual machine.

32. The method of claim 1, wherein the resource monitoring session is to monitor usage of the hardware in the computing environment that is shared by the first and second client computing entities.

33. The method of claim 1, wherein the first client computing entity is a first virtual machine, and the second client computing entity is a second virtual machine, and wherein the resource monitoring entity is a virtual machine monitor, and wherein the counter is a hardware event counter that generates an interrupt upon reaching the count.

34. The method of claim 23, wherein the resource monitoring session is to monitor usage of computer hardware in the computing environment that is shared by the first and second virtual machines.

35. The method of claim 1, wherein the plurality of samples are saved based on iterative performance of the initiating and saving steps.

36. The method of claim 23, wherein the plurality of samples are saved based on iterative performance of the initiating and saving steps.

37. The computer readable medium of claim 30, wherein the plurality of samples are saved based on iterative performance of the initiating and saving steps.

38. The computer readable medium of claim 31, wherein the plurality of samples are saved based on iterative performance of the initiating and saving steps.

* * * * *